United States Patent Office 3,262,862
Patented July 26, 1966

3,262,862
METHOD FOR PRODUCING LACTIC ACID WITH SPOROLACTOBACILLUS
Kakuo Kitahara, Tokyo, Japan, assignor to Kyowa Hakko Kogyo Co., Ltd., Tokyo, Japan, a corporation of Japan
No Drawing. Filed May 6, 1963, Ser. No. 278,452
Claims priority, application Japan, May 10, 1962, 37/18,216
5 Claims. (Cl. 195—48)

This invention relates to a method for producing lactic acid by a fermentation process. More particularly, it relates to a method for producing lactic acid by culturing a microorganism of the Sporolactobacillus group in a culture medium containing saccharide, i.e. carbon source, nitrogen source, inorganic materials, and other suitable nutrients, whereby a remarkable amount of lactic acid is formed and accumulated from the saccharide in the medium. The microorganism of the present invention was isolated by the present inventor from putrid feed stuff, and is designated by the subgeneric name, Sporolactobacillus.

An object of the invention is to provide a novel, efficient method for the production of lactic acid (or a salt thereof) which is an important material for chemical, food, and industrial uses, particularly for refreshing drinks. Other objects are apparent from the following descriptions.

The production of lactic acid by fermentation process has already been known. However, the present inventor has discovered the above-described novel microorganism having a powerful lactic acid-producing ability. According to the invention lactic acid can be produced in commercial scale in high yield from saccharide in higher concentration by use of the new microorganism.

In the production of lactic acid by the fermentation process heretofore employed, the maximum concentration of saccharide in culture medium has been limited to the range of 13 to 15%. In the present invention, this difficulty is overcome by the use of the specific microorganism concerned. This microroganism permits the use of a saccharide concentration of as high as 30% or more, as well as the low concentrations heretofore employed. In addition, it makes possible substantially 100% conversion of saccharide to lactic acid.

The present inventor has investigated many strains of lactobacilli, but the strains upon which this invention is based are novel and have not been perviously described. It is identified as Sporolactobacillus. The experimental method for the determination of their novelty is in accordance with the methods described in "Descriptive Chart" in "Manual of Methods for Pure Culture Study of Bacteria," American Society of Microbiology, McGraw-Hill, 1957.

(1) Microscopic observations: cultured in glucose-yeast extract-peptone agar at 37° C. for 24 hours.
  (1) Shape and size: occurring singly, in pairs, in short chains having average size of 0.7 x (3 to 5) microns.
  (2) Motility; motile with peritrichous flagella.
  (3) Endo spore: formed terminally after a few days, ellipsoidal, 0.8 x 1.0 micron.
    Sporangium: swells like plectridium.
  (5) Gram staining: positive.
(2) Gelatin stab: Cultured at 20° C. for 2 weeks.
  (6) Liquefaction: none.
(3) Milk culture: cultured at 35° C.
  (7) Litmus milk: no change.
(4) Favorable growth culture.
  (8) Culture medium: glucose-yeast extract-peptone medium, Difco $B_{12}$ assay medium permits favorable growth.
(5) Glucose broth culture: cultured at 35° C.
  (9) Turbidity and sediment: becoming turbid and slowly settling.
(6) Colonies on glucose agar to which colcium carbonate is added: cultured at 30° C.
  (10) Form: Punctiform colonies, diameter 0.5 to 1.0 mm., forming transparent halos due to the dissolution of calcium carbonate around the colonies.
(7) Glucose agar slant: cultured at 30° C.
  (11) Growth: slight.
(8) Glucose stab: cultured at 30° C.
  (12) Growth: filiform growth along the stab-canal, no surface growth.
(9) Physiological properties.
  (13) Reduction of nitrates; none.
  (14) Catalase: negative.
  (15) Growing temperature: 15° to 42° C.
  (16) Optimum temperature for growth: 35° C.
  (17) Oxygen requirement: slight or microaerophilic.
  (18) Optical rotation of fermented lactic acid: this microorganism yields homo-type lactic fermentation of glucose, forming only D(—)-lactic acid.
  (19) Availability of sugars: glucose, fructose, mannose, maltose, sucrose, trehalose, raffinose, inulin, mannitol, sorbitol and α-methyl glucoside being (+); galactose, sorbose, xylose, ribose, L-arabinose, D-arabinose, dextrin, dextran, and glycerol being (±); rhamnose, lactose, melibiose, cellobiose, melezitose, glycogen, starch, erythritol, adonitol, dulcitol, salicin, aesculin being (—).
  (20) Amino acid requirement: exacting toward leucine and valine.
  (21) Vitamin requirement: requiring calcium pantothenate and biotin, growth being accelerated by p-aminobenzoic acid; not requiring other vitamins.

When these properties are compared with those in the classification of Bergey's Manual of Determinative Bacteriology, 7th edition, there is no provision found for the present microorganism. When the microorganism is compared with fermenting Clostridium and so-called "spore-forming lactic acid bacteria" which are the most closely related to the present microorganism, the differences, as shown below, are recognized.

| | Sporolactobacillus | "spore-forming lacto-lactic acid bacteria" | "fermenting Clostridia" |
|---|---|---|---|
| 1. Gram staining | + | + | +. |
| 2. Motility | + | + | +. |
| 3. Flagella | Peritrichous | Generally peritrichous | Peritrichous. |
| 4. Endospore | + | + | +. |
| 5. Heat-resistance of spore | 95° C., 10 min | 100° C., 60 min | Tolerate higher than 100° C. |
| 6. Sporangia | Swell | Swell (sometimes) | Swell (generally). |
| 7. Catalase | — | + | —. |
| 8. Reduction of nitrates | — | + or — | —. |
| 9. Surface growth | — | + | —. |
| 10. Growth | — | + | —. |
| 11. Oxygen requirement | Microaerophilic | Aerobic | Anaerobic. |
| 12. Temperature | Mesophilic | Thermophilic | Mesophilic (generally). |
| 13. Agar colonies | Punctiform | Punctiform (gradually enlarged) | Formed only under anaerobic condition. |
| 14. Fermentation | Homo-type lactic acid fermentation, forming only D(—)-lactic acid. | Homo-type like lactic acid fermentation, forming only L(+)-lactic acid. | Butyric acid fermentation, forming volatile acids, solvents, and gas ($CO_2$, $H_2$); some racemic lactic acid under a restricted condition. |

Further, taxonomical position of the present microorganism is not clear enough. Someone may say that it should be Bacillus while another Clostridium. However, it would not be adequate to identify the present microorganism as Bacillus, since the present microorganism in catalase negative. There are some spore-forming lactic acid bacteria which belong to Baccillus, but they are all catalase positive. On the other hand, Clostridium is represented by so-called acetone-butanol-producing bacteria and its products are solvents (acetone, ethyl alcohol, propyl alcohol, iso-propyl alcohol, butanol etc.) volatile acids etc. and further gaseous compounds such as $H_2$, $CO_2$ and sometimes $CH_4$. The strain of the present application produces only D(—)-lactic acid. The strain of the present application also differs from ordinary Lactobaccillus in that it forms spores. I have made much of the fact that it forms lactic acid, so that it is identified as a subgenus of Lactobaccillus. If this strain did not form spore, it might be said to belong to a typical Lactobaccillus. According to Bergey's manual, the closest strains are *Lactobaccillus leichmannii*. However nutrition requirement of *Lactobaccillus leichmannii* is severe and complicated.

At any rate, from these points of difference, the present microorganism is recognized as being a novel species.

By culturing this microorganism in a medium containing suitable saccharide, nitrogen source, inorganic salt, other nutrients, and suitable buffer, such as calcium carbonate, a remarkable amount of lactic acid is accumulated in the medium.

Any saccharide, i.e. carbon source, such as carbohydrate (glucose, fructose, sucrose and inulin), starch hydrolyzate, molasses and others available to the present microorganism, can be used either singly or in combination.

Nitrogen sources are amino acids, such as leucine and valine, peptone, NZ-amine, meat extract, yeast extract, corn steep liquor, casein hydrolyzate, fish meal or its digested product, and hydrolyzates of defatted soy bean and chrysalis. The nitrogen sources can be employed either singly or in any combination.

Inorganic salts may also be used as nutrient, e.g. dipotassium hydrogen phosphate, $K_2HPO_4$, magnesium sulfate, $MgSO_4 \cdot 7H_2O$, and manganese chloride, $$MnCl_2 \cdot 4H_2O$$

Substances required for the growth of the microorganism, such as pantothenic acid or its calcium salt and biotin, should also be contained in the culturing medium. Said leucine, valine, pantothenate and biotin are contained in yeast extract, peptone, NZ-amine, molasses, soybean and chrysalis hydrolyzate which are used for the medium.

The final product may be recovered by any one of the known processes.

In order to facilitate understanding the invention more clearly, examples are given below in which a typical strain of Sporolactobaccillus, *Sporolactobaccillus inulinus* nov. sp. (ATCC No. 14897), is employed.

Example 1

Three hundred and twenty grams of glucose, 5 grams of yeast extract, and 5 grams of peptone are dissolved in water to make one liter of medium, which is sterilized at 120° C. for 10 minutes. Each 100 ml. of the thus prepared culture medium is placed in a separate 300 ml.-volume flask. To each flask 20 grams of sterilized calcium carbonate are added. Then, 2 milliliters (ml.) of seed culture (preliminarily cultured) are added to each medium and incubated (standing still) at 35° C. for 7 days, fermentation occurring over this period. 31.3 grams of D(—)-lactic acid is obtained from the cultured broth produced. There remains no residual glucose in said broth.

This example is repeated with corresponding amounts of fructose, sucrose and inulin, respectively, in place of the indicated twenty grams of glucose with the same effective result.

Example 2

Thirty-five grams of cane sugar, 0.1 gram of meat extract and 0.3 gram of peptone are dissolved in water to make 100 ml. of aqueous medium, to which 25 grams of calcium carbonate are added. The medium is fermented as in Example 1, and 33.5 grams of D(—)-lactic acid are obtained therefrom after seven days.

This example is repeated with corresponding amounts (based on available nitrogen) of corn steep liquor, casein hydrolyzate and fish meal, respectively, in place of the indicated 0.3 gram of peptone with the same effective result.

Example 3

Eight hundred grams of glucose, 10 grams of yeast extract and 10 grams of peptone are dissolved in water to make 2 liters of a solution, to which 500 grams of calcium carbonate are added. The medium is treated as in Example 1, and 778 grams of D(—)-lactic acid are obtained therefrom after 14 days.

This example is repeated with corresponding amounts (based on available nitrogen) of NZ-amine, leucine and valine, respectively, in place of the indicated 10 grams of yeast extract with the same effective result.

Example 4

Five and four-tenths grams of glucose, 0.3 gram of yeast extract and 0.5 gram of peptone are dissolved in water to make 100 ml. of aqueous medium, to which 3.5 grams of calcium carbonate are added. The medium is treated as in Example 1, and 4.9 grams of D(—)-lactic acid are obtained therefrom after 5 days.

This example is repeated with corresponding amounts of starch hydrolyzate and molasses, respectively, in place of the indicated 4.5 grams of glucose with the same effective result.

This example is further repeated as initially presented except for the substitution of corresponding amounts (based on available nitrogen) of defatted soy beans and chrysalis hydrolyzate, respectively, in place of the indicated 0.3 gram of yeast extract with the same effective result.

Example 5

Thirty grams of dried powdered Jerusalem artichoke containing 19.5 g. of inulin, is suspended in 200 ml. of water and sterilized at 115° C. for 10 min. Twenty grams of $CaCO_3$ is separately sterilized and added to Jerusalem artichoke solution. The medium is cultured as in Example 1, and 20.3 g. of D(—)-lactic acid are obtained therefrom after 7 days.

Example 6

To a cultured broth which has been completed fermentation an amount of $Ca(OH)_2$ is added to raise the pH to about 10, the broth is heated to about 100° C. (by this treatment suspensions of cells are precipitated) and the supernatant liquid is separated. The precipitate is with the addition of $CaSO_4$ as an assistant, which is formed as a by-product in the following process, squeezed and filtered off. Decanted liquid and the filtrate are mixed and introduced into a crystallization tank and the mixture is stood to cool to precipitate crystals. The crystals are separated by a centrifuger, then to the obtained Ca-lactate, a corresponding amount of $H_2SO_4$ is added and lactic acid is obtained after removing the precipitated $CaSO_4$.

The invention and its advantages are readily understood from the foregoing description, and it is apparent that various changes may be made in the process without departing from the spirit and the scope of the invention or sacrificing its material advantages, the process hereinbefore described being merely illustrative of preferred embodiments of the invention.

What is claimed is:

1. A fermentation method for the production of lactic acid which comprises culturing a Sporolactobacillus in a culture medium containing saccharide, nitrogen source, inorganic salt and other nutrient required for the growth of the said Sporolactobacillus, whereby lactic acid is formed from the saccharide and accumulated in the medium.

2. A method according to the claim 1 in which said Sporolactobacillus is a strain of *Sporolactobacillus inulinus* nov. sp.

3. A method according to the claim 1, in which said saccharide is a member selected from the group consisting of glucose, cane sugar, inulin and inulin containing raw materials.

4. A method according to the claim 1 in which said lactic acid is D(—)-lactic acid.

5. A method according to claim 1 wherein the said Sporolactobacillus is *Sporolactobacillus inulinus* nov. sp. (ATCC No. 14897).

References Cited by the Examiner

UNITED STATES PATENTS

| 1,074,708 | 10/1913 | Friedberger | 195—48 |
| 1,249,511 | 12/1917 | Saxe | 195—48 |
| 2,132,712 | 10/1938 | Ward et al. | 195—48 |
| 2,143,360 | 1/1939 | Needle | 195—48 |

A. LOUIS MONACELL, *Primary Examiner.*

D. M. STEPHENS, *Assistant Examiner.*